United States Patent
Born et al.

(10) Patent No.: US 11,969,955 B2
(45) Date of Patent: Apr. 30, 2024

(54) COMPONENT MADE OF A FIBER-REINFORCED PLASTIC WITH REDUCED PULL-APART STRESS AND METHOD FOR PRODUCING THE SAME

(71) Applicant: Airbus Operations GmbH, Hamburg (DE)

(72) Inventors: Johannes Born, Bremen (DE); Dirk Elbracht, Buxtehude (DE); Konstantin Schubert, Mittelnkirchen (DE)

(73) Assignee: Airbus Operations GmbH, Hamburg (DE)

(*) Notice: Subject to any disclaimer, the term of this patent is extended or adjusted under 35 U.S.C. 154(b) by 391 days.

(21) Appl. No.: 17/514,783

(22) Filed: Oct. 29, 2021

(65) Prior Publication Data

US 2022/0118719 A1 Apr. 21, 2022

Related U.S. Application Data

(63) Continuation of application No. PCT/EP2020/080012, filed on Oct. 26, 2020.

(30) Foreign Application Priority Data

Oct. 28, 2019 (DE) ...................... 10 2019 128 997.1

(51) Int. Cl.
*B29C 70/30* (2006.01)
*B29C 70/24* (2006.01)
(Continued)

(52) U.S. Cl.
CPC ............. *B29C 70/30* (2013.01); *B29C 70/24* (2013.01); *B29C 70/382* (2013.01); *B33Y 80/00* (2014.12);
(Continued)

(58) Field of Classification Search
CPC ....... B29C 70/24; B29C 70/30; B29C 70/302; B29C 70/38; B29C 70/382; B29C 70/384;
(Continued)

(56) References Cited

U.S. PATENT DOCUMENTS

| 2012/0256348 A1 | 10/2012 | Bergmann |
| 2013/0233474 A1* | 9/2013 | De Mattia ............. B29C 53/083 156/222 |

(Continued)

FOREIGN PATENT DOCUMENTS

| DE | 102011017460 A1 | 10/2012 |
| EP | 2014437 A1 | 1/2009 |
| EP | 2639047 A1 | 9/2013 |

OTHER PUBLICATIONS

German Search Report for Application No. 102019128997.1 dated Jul. 8, 2020.

(Continued)

*Primary Examiner* — Zachary M Davis
(74) *Attorney, Agent, or Firm* — KDW Firm PLLC

(57) ABSTRACT

A component made of a fiber-reinforced plastic, having a first surface portion, a second surface portion and a transition portion, which is enclosed by the first surface portion and the second surface portion, wherein surface tangents to the first surface portion and the second surface portion are not parallel, at least in regions adjacent to the transition portion. The transition portion has a curvature adjoining the adjacent surface portions in a tangentially constant manner, wherein an arrangement of at least two layers made of a fiber-reinforced plastic extends from the first surface portion, over the transition portion, onto the second surface portion, and fibers at least of one of the layers run with an unchanging orientation on the first surface portion and the second surface portion and, on the transition portion, run in (Continued)

a laterally offset, inflected or curved manner along the running direction.

15 Claims, 2 Drawing Sheets

(51) Int. Cl.
    *B29C 70/38* (2006.01)
    *B33Y 80/00* (2015.01)
    *B29K 101/12* (2006.01)
    *B29L 31/30* (2006.01)

(52) U.S. Cl.
    CPC ... *B29K 2101/12* (2013.01); *B29L 2031/3082* (2013.01)

(58) Field of Classification Search
    CPC .... B32B 5/00; B32B 5/02; B32B 5/12; B32B 5/142
    See application file for complete search history.

(56) References Cited

U.S. PATENT DOCUMENTS

| | | | |
|---|---|---|---|
| 2014/0113107 A1* | 4/2014 | Kremer | B64C 1/14 428/121 |
| 2016/0151983 A1 | 6/2016 | Coquel et al. | |
| 2016/0263879 A1 | 9/2016 | Desjardien et al. | |
| 2019/0009472 A1 | 1/2019 | Mark | |

OTHER PUBLICATIONS

International Search Report and Written Opinion for Application No. PCT/EP2020/080012 dated Jan. 18, 2021.

* cited by examiner

COMPONENT MADE OF A FIBER-REINFORCED PLASTIC WITH REDUCED PULL-APART STRESS AND METHOD FOR PRODUCING THE SAME

CROSS-REFERENCE TO RELATED APPLICATIONS

This application is a continuation of and claims priority to PCT/EP2020/080012 filed Oct. 26, 2020, which claims priority to German Patent Application No. 10 2019 128 997.1 filed Oct. 28, 2019, the entire disclosures of which are herein incorporated by reference.

TECHNICAL FIELD

The disclosure herein relates to a component made of a fiber-reinforced plastic, to a vehicle with such a component, and to a process for producing a component of this kind.

BACKGROUND

Components made of a fiber-reinforced plastic are designed for a multiplicity of different end-use applications. In the designing of the components, orientations and courses of fibers, numbers of plies of fibers, and transitions between expansive portions are adapted to the anticipated loads. Not only large-format components but also small-format components are widespread, with a relatively simple geometric design. In the designing of aircraft fuselages made of fiber-reinforced plastic, for example, it is known practice to employ a multiplicity of angular components (referred to as "brackets") which are secured on the inside to the fuselage and which carry various other components, such as frames arranged on the side of the fuselage periphery.

Components of these kinds are typically provided with at least two surface portions which are disposed at an angle to one another and which are joined to one another via a bent transition portion. The surface portions may for instance be largely perpendicular to one another. Because of the typically nonisotropic properties of the material, a strong coupling of flexural stresses and stresses in the thickness direction is apparent in the transition portion. Interlaminar peeling stresses may arise during the loading of the component, since under external load in the transition portion the component becomes stretched and is additionally bent counter to its direction of curvature. Radial components of the peeling stresses may cause individual plies within the laminar construction to part from one another in the transition portion. In order to prevent this, it is known practice to give the transition region a somewhat more complex shaping.

DE 10 2011 017 460 A1 discloses for this purpose, for instance, a transition portion between two surface portions disposed at an angle to one another, where the transition portion comprises at least one first curvature portion and at least one second curvature portion, the mean curvatures of which differ from one another and which adjoin one another in tangential continuity. The first surface portion adjoins the transition portion, and the transition portion adjoins the second surface portion, in each case with tangential continuity. In this case the radius of curvature of the first curvature portion is less than that of the second curvature portion.

SUMMARY

It is an object of the subject matter herein to produce a component made of a fiber-reinforced plastic wherein peel stresses are reduced or avoided in a transition portion between two surface portions, the component being simple to manufacture at the same time.

The object is achieved by a component having features disclosed herein. Advantageous embodiments and developments are apparent from the disclosure herein.

A component made of a fiber-reinforced plastic is proposed, comprising a first surface portion, a second surface portion, and a transition portion enclosed by the first surface portion and the second surface portion, wherein surface tangents of the first surface portion and of the second surface portion are not parallel at least in regions bordering the transition portion, wherein the transition portion has a curvature which adjoins the bordering surface portions with tangential continuity, wherein an arrangement of at least two plies of a fiber-reinforced plastic extends from the first surface portion via the transition portion to the second surface portion, and wherein fibers of at least one of the plies run with a consistent orientation on the first surface portion and the second surface portion and exhibit a course which is curved, kinked or offset laterally along the running direction on the transition portion.

The first surface portion and the second surface portion may form, together with the transition portion, an at least regionally L-shaped component. The portions here comprise at least two plies of the fiber-reinforced plastic. The plies preferably extend completely over both surface portions and the transition portion, and form preferably continuous sheets of the relevant material. The material comprises reinforcing fibers incorporated in a matrix made of a plastic. The plastic could be a resin, and more particularly a thermosetting resin. Alternatively a thermoplastic might also be used.

In order to optimize the component strength generally, the first surface portion, the second surface portion and the transition portion are preferably configured with tangential continuity to one another. Accordingly, there are preferably no discontinuities in the curvature of the component, and so no stress discontinuities arise. The orientation of the reinforcing fibers in the two surface portions may be identical to one another. A differing orientation of the fibers is provided only in the transition portion.

As indicated above, planar and curved components differ from one another in that a flexural load may lead to stressing in the thickness direction in the form of peeling stresses Gr. In the case of an identical external load on the component for instance a smaller radius of curvature lead to a greater stressing in the thickness direction than a larger radius. A delamination will be driven primarily by the curvature as the reciprocal value of the radius of curvature. A greater curvature might be responsible for greater peeling stresses than a lesser curvature. It may be favorable to keep the radius of curvature of the component constant, in order, for example, to simplify manufacture or for reasons of greater ease of installation of the component. In the case of the construction of components from a fiber composite material with a first surface portion and with a second surface portion disposed at an angle to the first, a radius of curvature cannot be increased infinitely, since the fiber composite component typically only has a limited installation space available. Such restrictions may be in the form of specific positions of connectors such as rivets, bolts or the like in the surface portions, but may also be dictated by the extent of adjacently positioned fiber composite components or other elements.

In accordance with the disclosure herein, however, the changed fiber course may lead to a reduced peeling stress. As a result of the changed fiber course, there is an improvement in the effective resistance to delamination, because of improvement in the ratio between flexure and strength in the thickness direction. The local change in the fiber orientation influences the effective arrangement of the mutually superposed plies within the transition portion, which then differs from the arrangement in the rest of the portions of the component. In addition, during the placement of the plies of the component or the placement of the preform which is subsequently shaped to give the desired component geometry, local orientations within the transition portion are altered. The fiber course is preferably continuous and comprises no sharp edges or transitions.

This can be accomplished with any operation which enables a local change in fiber orientation, such as, for example, a tailored fiber placement (TFP) process for dry fibers, a fiber patch placement process, an automated fiber placement (AFP) process, a 3D printing process with fiber reinforcement, or other, suitable processes. In the disclosure herein the fiber orientation will remain unaltered within the transition portion in the regions bordering the transition portion, while the fibers are offset laterally along their longitudinal direction. As a result of the lateral offset, a change in angle of local tangents along the running direction of the relevant fibers may, for example, increase continuously over the transition portion and decrease again continuously subsequently.

As a result of the design according to the disclosure herein with locally optimized fiber orientations, produced without introduction of splices/layer cuts, and also with unaltered properties in the surface portions bordering the transition portion, an effective improvement is achieved in the peeling stress behavior. The local modification may be produced either in a netlike laydown operation, such as during laydown onto the mold during an AFP operation or into the mold in the case of direct 3D printing, or else during a preforming operation, by the TFP process or by printing of the desired intermediate and subsequent reshaping, for instance. This enables the adaptation of the local properties, particularly the increasing of the local flexural stiffness and the reduction of the local axial stiffness, without the fibers being cut, and hence enables improvements in the context of the peeling stress, without contravening geometric restrictions and/or causing changes in the effective properties of the surface portions.

In one preferred embodiment the offset or curved course comprises a change in angle of local tangents along the running direction of the relevant fibers. This change in angle may be elucidated preferably on the basis of a planar development of the component in the region of the transition portion and at least of the bordering regions of the first and second surface portions. Instead of a development, it would also be possible to form a projection onto a plane which intersects the two surface portions and lies symmetrically to the transition portion. In the case of conventional components of this construction without adaptation to the fiber course, the individual fibers on the development or on the plane projection would run in a straight line over the bordering region of the first surface portion, over the transition portion and over the bordering region of the second surface portion. Customarily, therefore, the fibers form straight lines in the region under consideration. The tangents of the relevant fibers on the transition portion (in the development or plane projection) are therefore parallel to one another over the entire transition portion and parallel to the respective tangents on the first and second surface portions. In the disclosure herein the tangents in the development or in the plane projection deviate from the courses on the first and second surface portions. In this case the local tangents of the fiber courses may have tangential continuity especially in a connecting region between the transition portion and a respective surface portion. Such continuity, however, is not absolutely necessary. The angles in a connecting region might also display sharply discontinuous changes.

In one preferred embodiment, the change in angle increases continuously over the transition portion and decreases again continuously subsequently. With increasing distance from a border between the transition portion and a respective surface portion, the local lateral offset or the local change in angle becomes greater. The continuous increase and decrease provide a course with tangential continuity on the transition portion, which possesses a curved course in the development or the plane projection.

The changes in angle preferably run symmetrically over the transition portion. As a result of the symmetrical course it is also possible for the course of the peeling stress to be influenced particularly harmonically, which in turn also significantly reduces the tendency toward delamination.

It is advantageous if the changes in angle are situated in a range from −30° to 30° and preferably in a range from −15° to 15°. Larger changes in angle might require larger transition portions. Changes in angle of up to 30° are already very significant and are able effectively to reduce the local peeling stresses significantly. In the designing of a component according to the disclosure herein, there is a balance to be struck between possible course of change in angle and generally possible dimensions of the transition portion.

It is advantageous, moreover, if the course of the relevant fibers on the transition portion adjoins the course on the surface portions with tangential continuity. In this way sharply discontinuous changes in a strength or in a stress course can be prevented.

It may be particularly advantageous, furthermore, for fibers of at least one of the plies to run with different orientations on the first surface portion and the second surface portion. Besides the special designing of the transition portion, it is possible, by choosing different course angles on the two surface portions, to achieve still further improvement in the behavior of the component with respect to the peeling stress. This behavior may be optimized through a combination of the choice of the change in angle on the transition portion and also of the difference in angle on the two surface portions.

The fiber-reinforced plastic may comprise a thermoplastic matrix material. Thermoplastic materials have the advantage that they can be effectively melted or at least softened regionally, in order for placed-on and oriented fibers to be attached or enclosed, for example. Thermoplastic matrix material might for instance comprise polyamide, polyetherimide, PEKK, PEEK, PAEK, PPS or other suitable materials.

The disclosure herein further relates to a process for producing a component for a vehicle, comprising the steps of providing a mold on which there are a first laydown area, a second laydown area and, enclosed by them, a curved transition area, with surface tangents of the first laydown area and of the second laydown area being not parallel at least in regions bordering the transition area, laying down a plurality of plies of a plastic, comprising fibers, onto the mold, so that the ply extends from the first laydown area via the transition area to the second laydown area to form a first surface portion, a second surface portion and a transition portion, with the fibers of at least one of the plies running with a consistent orientation on the first surface portion and the second surface portion and exhibiting a course which is curved or offset laterally along the running direction on the transition portion, curing the component, and removing the component from the mold.

The laydown here may take place on the basis of an operation in a group of operations, wherein the group comprises a tailored fiber placement (TFP) process with dry fibers, a fiber patch placement process, an automated fiber placement process, and a 3D printing process with fiber reinforcement.

With preference the changes in angle are in a range from −30° to 30° and preferably in a range from −15° to 15°.

It is particularly advantageous, additionally, if the plies are enclosed in a thermoplastic matrix.

The disclosure herein further relates to a vehicle comprising at least one component according to the description above.

The vehicle might be an aircraft and might have a fuselage made of a fiber-reinforced plastic.

In one advantageous embodiment, the at least one component is a connecting component which is disposed on an inside of the fuselage and is connected to a component disposed within the fuselage.

Lastly the fuselage may comprise a thermoplastic matrix material with fibers embedded therein.

BRIEF DESCRIPTION OF THE DRAWINGS

Additional features, advantages and possible applications of the disclosure herein are apparent from the description below of the exemplary embodiments and the figures. In this description, all of the features described and/or depicted, by themselves and in any desired combination, form the subject matter of the disclosure herein, independently also of their composition in the individual claims or dependency references therein. In the figures, reference symbols which are still the same represent identical or similar objects.

DETAILED DESCRIPTION

Figure 1:
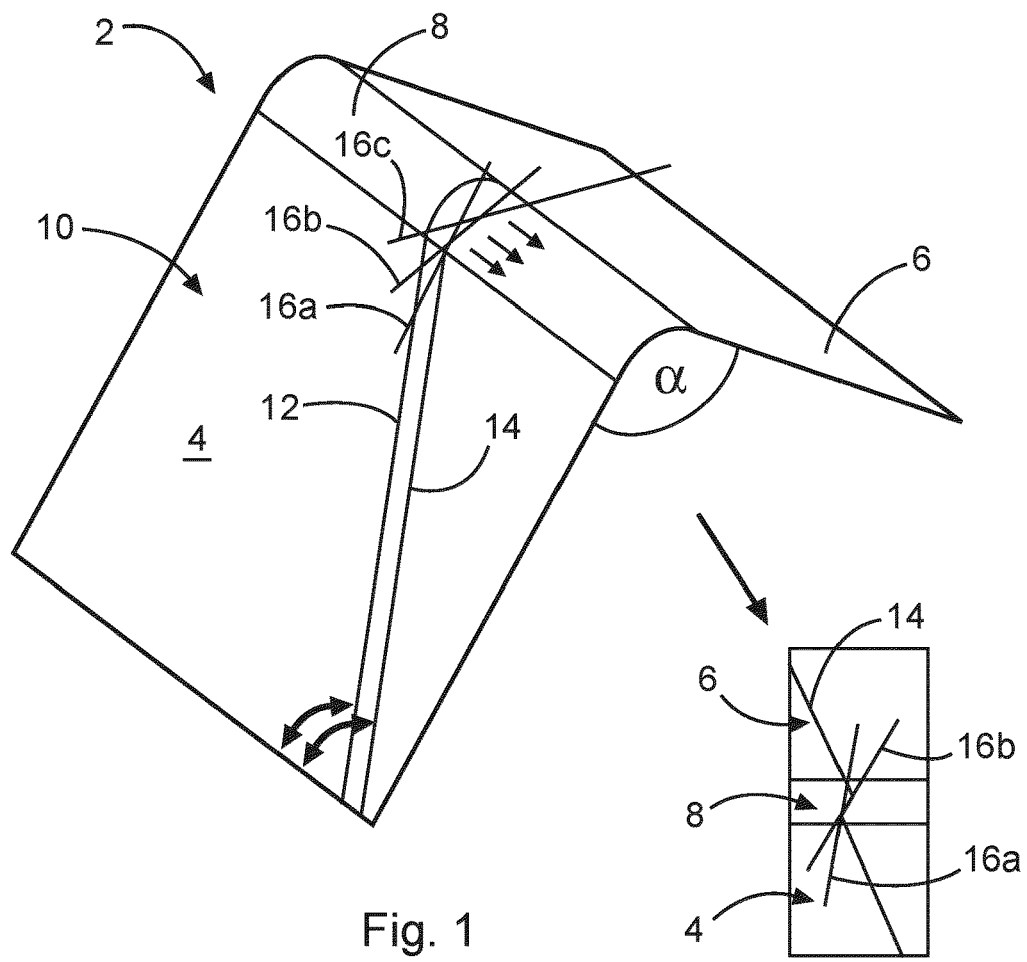
FIG. 1 shows a component according to the disclosure herein in a schematic, three-dimensional view and also in a detail of a development of the component.

FIG. 1 shows a component 2 made of a fiber-reinforced plastic. The component 2 has a first surface portion 4, a second surface portion 6, and a transition portion 8 which is enclosed by the first surface portion 4 and the second surface portion 6. The component 2 is represented only very schematically, and the two surface portions 4 and 6 are planar or flat in their implementation. They enclose an angle α of approximately 90° to one another. The transition portion 8 has a continuous curvature, illustratively, and adjoins the two surface portions 4 and 6 with tangential continuity, likewise illustratively. As a result, a harmonic transition via the angle α is produced. The radius of curvature of the transition portion 8 may be dimensioned according to the extant or appropriate installation space.

The component 2 may comprise a plurality of plies 10 of a fiber-reinforced plastic. The plies 10 are superposed on one another and are preferably connected substance-to-substance and jointly cured. This produces a high-strength fiber composite component. Loads which act on the surface portions 4 and/or 6 automatically lead also to stresses in the transition portion 8.

As elucidated above, the loads acting on the component 2 in the transition portion 8 may lead to peeling stresses, as a result of which plies 10 might in an extreme case part from one another locally. Such delamination is to be prevented, in order to allow the function of the component 2 to be ensured.

Conventional components use fibers 12 which in their associated fiber ply comprise a consistent orientation which is constant over all portions 4, 6 and 8. Peeling stresses can be reduced only by increasing the radius of curvature. Additionally, delamination can be prevented also by a corresponding choice of the thickness of component 2. Increasing the thickness or the radius of curvature, however, is not infinitely possible and would increase the weight and the installation footprint of component 2.

Provided in the disclosure herein are fibers 14 which have the same orientation only at the surface portions 4 and 6. In the transition portion 8, however, the orientations of the fibers 14 have a lateral offset, as indicated by the arrows in the transition portion 8. Accordingly, in the transition portion 8, local tangents 16a, 16b, 16c, etc. open up an angle to the respective course on the first surface portion 4 and/or the second surface portion 6, this angle being measured laterally, i.e., parallel to the axis of curvature, in the development of component 2. This is shown in a small detail in the drawing plane at the bottom right once again, by a plan view of the development.

Figure 2:
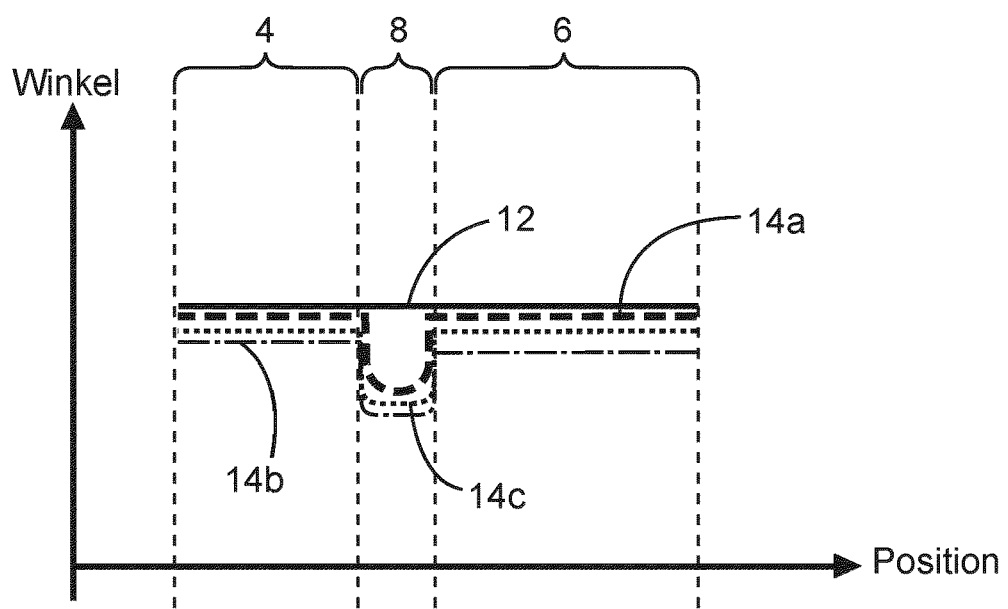
FIG. 2 shows an angular course of fibers of component 2.

FIG. 2 represents the lateral change in angle once again by a diagram. The Y-axis here represents a local orientation angle of a fiber 14 on the basis of three examples with reference symbols 14a, 14b and 14c, in a system of coordinates fixed on the surface of the component. The X-axis here represents the position along the surface of component 2. A left-hand region represents the first surface portion 4. A right-hand region represents the second surface portion 6. Enclosed thereby is the transition portion 8. Whereas a customary fiber 12, which is indicated here with a continuous line, has a consistent angle, an angular deviation in a fiber 14a of component 2 according to the disclosure herein is clearly apparent. The change in angle increases continuously—illustratively—over the transition portion 8 as the course increases, before then dropping continuously again and having the same orientation as for the conventional fiber orientation of the fiber 12 in both surface portions 4 and 6. A course of an additional or alternative fiber 14b, represented with a dashed-and-dotted line, may additionally have different angles on the surface portions 4 and 6. As a result of the switch in the fiber orientation, it is possible to achieve a further improvement in the peeling stress behavior. This change in angle may run harmonically as for fiber 14a, albeit also in the form of a more abrupt change in angle. In that case the angle α would largely form a plateau in the transition portion 8, as shown with the course of the fiber 14b. The dotted course line of a fiber 14c might run as for fiber 14a, but with a plateau as for fiber 14b.

Figure 3:
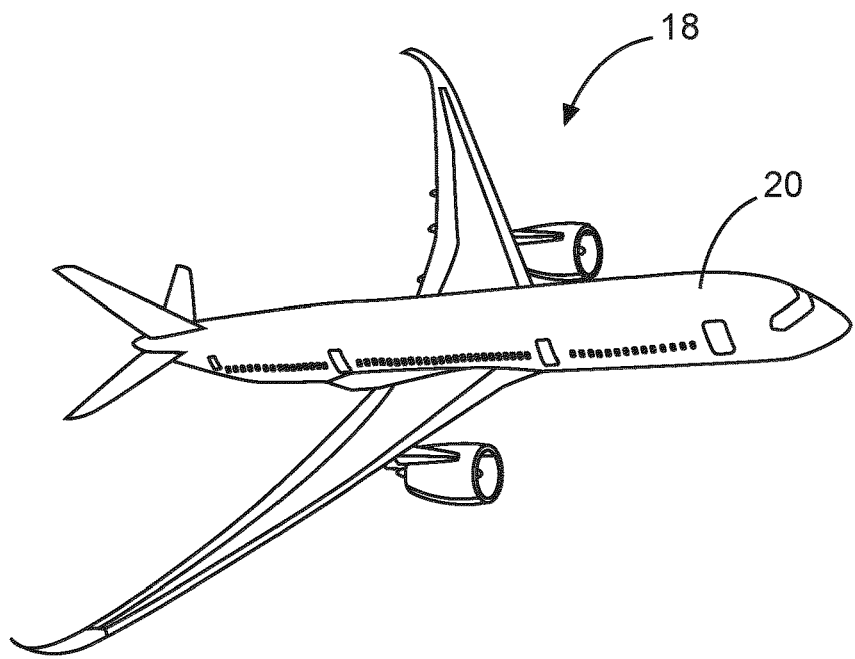
FIG. 3 shows an aircraft into which such a component is integrated.

FIG. 3 shows an aircraft 18 which comprises a fuselage 20. The interior of the fuselage 20 may house, for example, a plurality of components 2, which may be connected to the inside of the fuselage 20.

Figure 4:
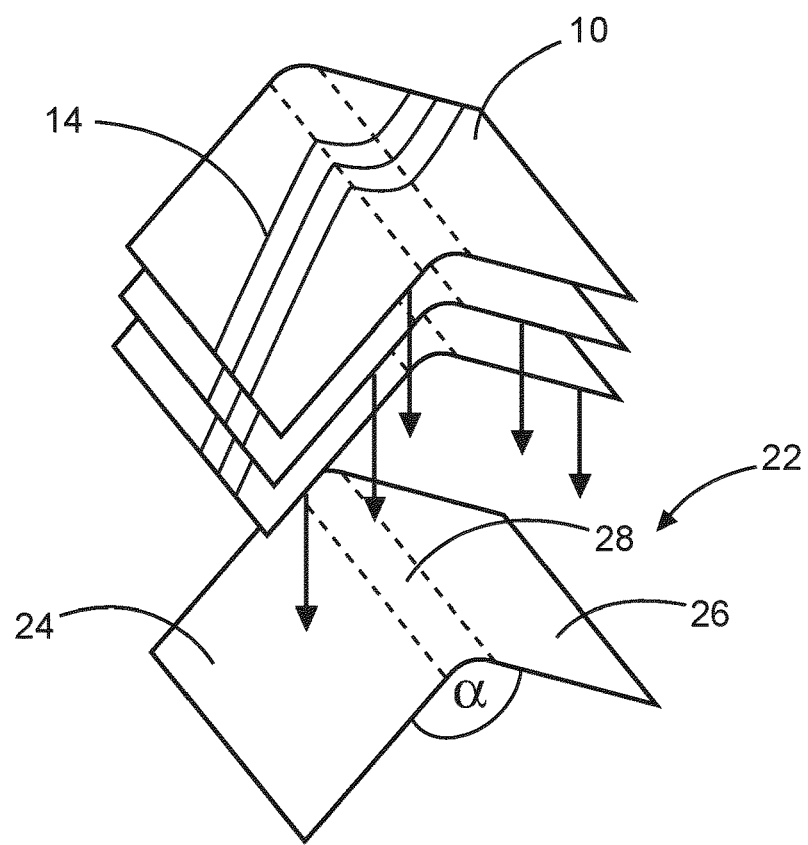
FIG. 4 shows schematically a process for producing a component according to the disclosure herein on a mold.

FIG. 4 shows a mold 22, on which there are a first laydown area 24, a second laydown area 26, and a transition area 28 which is enclosed by them and which, illustratively, has a continuous curvature. As shown for the component in FIG. 1, surface tangents of the first laydown area 24 and of the second laydown area 26 are not parallel at least in the regions shown that border the transition area 28. Here again they enclose the angle α to one another.

A plurality of plies 10 of a fiber-reinforced plastic are laid down onto the mold 22. The plies 10 then extend from the first laydown area 24 via the transition area 28 to the second laydown area 26. This forms the first surface portion 4, the second surface portion 6, and the transition portion 8 enclosed thereby. The fibers 14 here are oriented as explained with reference to FIG. 1. The plies 10 are subsequently jointly cured, and the resultant component 2 is removed from the mold 22 again. The curing may take the form both of the supply of heat to cure a thermosetting resin, and also the cooling of a thermoplastic matrix material.

For completion it may be pointed out that "comprising" does not rule out any other elements or steps, and "a", "an" or "one" does not rule out a multiplicity. It may be pointed out, furthermore, that features described with reference to one of the exemplary embodiments above can also be used in combination with other features of other exemplary embodiments described above. Reference symbols in the claims should not be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOLS

2 component
4 first surface portion
6 second surface portion
8 transition portion
10 ply
12 conventional fiber
14 fiber
16 tangent (16a, 16b, 16c, . . . )
18 aircraft
20 fuselage
22 mold
24 first laydown area
26 second laydown area
28 transition area
α angle between surface portions or laydown areas

The invention claimed is:

1. A component comprising a fiber-reinforced plastic, comprising:
   a first surface portion;
   a second surface portion;
   a transition portion enclosed by the first surface portion and the second surface portion;
   wherein surface tangents of the first surface portion and of the second surface portion are not parallel at least in regions bordering the transition portion,
   wherein the transition portion has a curvature which adjoins the bordering surface portions with tangential continuity,
   wherein an arrangement of at least two plies of a fiber-reinforced plastic extends from the first surface portion via the transition portion to the second surface portion, and
   wherein fibers of at least one of the plies run with a consistent orientation on the first surface portion and the second surface portion and exhibit a course which is curved, kinked or offset laterally along a running direction on the transition portion.

2. The component of claim 1, wherein the offset or curved course comprises a change in angle of local tangents along the running direction of the fibers.

3. The component of claim 2, wherein the change in angle increases over the transition portion and decreases again subsequently.

4. The component of claim 2, wherein the changes in angle run symmetrically over the transition portion.

5. The component of claim 2, wherein the changes in angle are situated in a range from −30° to 30°, or in a range from −15° to 15°.

6. The component of claim 1, wherein the course of the fibers on the transition portion adjoins a course on the surface portions with tangential continuity.

7. The component of claim 1, wherein the fiber-reinforced plastic comprises a thermoplastic matrix material.

8. A process for producing a component for a vehicle, comprising:
   providing a mold on which there are a first laydown area, a second laydown area, and, enclosed by the first laydown area and the second laydown area, a curved transition area, with surface tangents of the first laydown area and of the second laydown area being not parallel at least in regions bordering the transition area;
   laying down a plurality of plies of a plastic, comprising fibers, onto the mold, so that the plies extend from the first laydown area via the transition area to the second laydown area to form a first surface portion, a second surface portion and a transition portion, with the fibers of at least one of the plies running with a consistent orientation on the first surface portion and the second surface portion and exhibiting a course which is curved, kinked or offset laterally along the running direction on the transition portion;
   curing the component; and
   removing the component from the mold.

9. The process of claim 8, wherein the laydown takes place on a basis of an operation of a group of operations, the group comprising:
   tailored fiber placement with dry fibers;
   fiber patch placement;
   automated fiber placement; and
   a 3D printing process with fiber reinforcement.

10. The process of claim 8, wherein the changes in angle are situated in a range from −30° to 30°, or in a range from −15° to 15°.

11. The process of claim 8, wherein the plies are enclosed in a thermoplastic matrix.

12. A vehicle, comprising at least one component of claim 1.

13. The vehicle of claim 12, wherein the vehicle is an aircraft and comprises a fuselage made of a fiber-reinforced plastic.

14. The vehicle of claim 13, wherein the at least one component is a connecting component which is disposed on an inside of the fuselage and is connected to a component disposed within the fuselage.

15. The vehicle of claim 12, wherein the fuselage comprises a thermoplastic matrix material with fibers embedded therein.

\* \* \* \* \*